Patented June 14, 1932

1,863,517

UNITED STATES PATENT OFFICE

WILLIAM DAWSON WHITE, OF OCALA, FLORIDA

SMUDGE BRICK

No Drawing. Application filed June 22, 1931. Serial No. 546,172.

This invention relates to the protection of groves, orchards and the like from frost.

In sections where citrus fruits are grown, it is the custom of the growers, when a frost warning is received, to light fires, smoke pots, smudges, etc., in their groves or orchards, thus creating a slight artificial rise in the temperature of the air surrounding the trees.

My invention particularly relates to the production of an inflammable brick of a nature adaptable for use as fuel in the production of a temperature raising smudge or smoke of the character set forth.

The object of the invention is to produce a brick of this character that will burn slowly and emit a heavy, low-lying cloud of smoke which will stay close to the ground, thus imparting maximum heat to the air about the trees and resisting dissipation into the surrounding atmosphere.

In carrying out the invention, the following formula illustrative of my invention may be employed:

| | Per cent |
|---|---|
| Sawdust | 40 |
| Rubber | 12 |
| Cotton | 18 |
| Rosin | 20 |
| Strainer dross | 10 |

After thorough testing, I have found that these ingredients, in substantially the quoted proportions, when properly prepared, form a brick that is effective for the purpose indicated, and which may be manufactured at relatively low cost.

The formula given may be altered in certain respects without departing from the spirit of my invention. In some cases the addition of dross may be unnecessary; well-known equivalents may be substituted for the sawdust and other ingredients; and percentages may be varied according to circumstances, for example, more of the heavier materials might be required on windy nights and other substances might be added for this and other reasons.

In the manufacture of the bricks, the sawdust, rubber and cotton are thoroughly ground and mixed and the mixture is heated to a temperature of between 140° and 150° F.

The rosin and dross are thoroughly ground and mixed and this mixture is separately heated to a temperature of between 160° and 170° F.

The two heated mixtures are then combined, thoroughly mixed together, and the resultant mixture is then pressed into bricks and allowed to cool.

The cooled bricks are ready for use.

Having thus described my invention, I claim:—

1. A fuel mixture of the character specified comprising, as ingredients, sawdust, rubber, cotton and rosin.

2. A fuel brick of the character specified comprising, as ingredients, sawdust, rubber, cotton and rosin.

3. A fuel mixture of the character specified including, as ingredients, in the substantial proportions, forty percent sawdust, twelve percent rubber, eighteen percent cotton, and twenty percent rosin.

4. A fuel brick of the character specified including, as ingredients, in the substantial proportions, forty percent sawdust, twelve percent rubber, eighteen percent cotton, and twenty percent rosin.

5. The method herein set forth of producing a fuel mixture, including in mixing, in substantially the following proportions, forty percent sawdust, twelve percent rubber, eighteen percent cotton, and twenty percent rosin.

6. The method herein set forth of producing a fuel brick, including in mixing, in substantially the following proportions, forty percent sawdust, twelve percent rubber, eighteen percent cotton, and twenty percent rosin, and forming bricks of the resultant mixture.

7. The method herein set forth of producing a fuel mixture, consisting in grinding, mixing, and heating predetermined quantities of sawdust, rubber, cotton and rosin.

8. The method herein set forth of producing a fuel brick, consisting in grinding, mixing, and heating predetermined quantities of sawdust, rubber, cotton and rosin, and forming bricks of the resultant mixture.

9. The method herein set forth of producing a fuel brick of the character specified, consisting in grinding, mixing, and heating predetermined quantities of sawdust, rubber, and cotton, grinding, mixing, and heating predetermined quantities of rosin and dross, combining and mixing the two heated mixtures, and forming bricks of the resultant mixture.

10. The method herein described of producing a fuel brick of the character specified, consisting in grinding, mixing and heating to a temperature of between 140° and 150° F., predetermined quantities of sawdust, rubber, and cotton, grinding, mixing, and heating to a temperature of between 160° and 170° F., predetermined quantities of rosin and dross, combining and mixing the two heated mixtures, and forming bricks of the resultant mixture.

In testimony whereof I affix my signature.

WILLIAM DAWSON WHITE.